(12) United States Patent
Greiner

(10) Patent No.: US 8,764,230 B2
(45) Date of Patent: Jul. 1, 2014

(54) LUMINOUS BODY

(75) Inventor: Horst Greiner, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 1143 days.

(21) Appl. No.: 10/597,752

(22) PCT Filed: Jan. 27, 2005

(86) PCT No.: PCT/IB2005/050355
§ 371 (c)(1),
(2), (4) Date: Aug. 7, 2006

(87) PCT Pub. No.: WO2005/078487
PCT Pub. Date: Aug. 25, 2005

(65) Prior Publication Data
US 2008/0144312 A1    Jun. 19, 2008

(30) Foreign Application Priority Data
Feb. 11, 2004  (EP) ..................................... 04100518

(51) Int. Cl.
*F21V 1/00*       (2006.01)
(52) U.S. Cl.
USPC ............ 362/240; 362/244; 362/245; 362/246

(58) Field of Classification Search
USPC ................... 362/27, 237, 240, 242–246, 259; 315/82
See application file for complete search history.

(56) References Cited

U.S. PATENT DOCUMENTS

| 6,345,903 | B1 * | 2/2002 | Koike et al. .................... 362/241 |
| 6,404,131 | B1 * | 6/2002 | Kawano et al. .................. 315/82 |
| 6,578,990 | B2 * | 6/2003 | Hildenbrand et al. ......... 362/341 |
| 2002/0054489 | A1 * | 5/2002 | Hirayama ........................ 362/31 |
| 2004/0190304 | A1 * | 9/2004 | Sugimoto et al. ............. 362/555 |

* cited by examiner

*Primary Examiner* — Sean Gramling
(74) *Attorney, Agent, or Firm* — Yuliya Mathis

(57) ABSTRACT

A luminous body is described, in particular in the form of a planar lighting device for general lighting or for back-lighting of displays, which luminous body comprises a plurality of light sources (2), for example LED elements, arranged in a housing (10), in particular an optical waveguide plate (1). The optical waveguide plate (1) forms a first optical medium (1) with a first optical scattering power, into which the light of the light sources (2) is coupled. Furthermore, at least one second optical medium (5) with a second optical scattering power is provided, such that the light propagating in the second optical medium (5) is at least substantially coupled in from the first optical medium (1), and the scattering power of at least one of the media is chosen for the purpose of influencing the flow of light in the housing (10) such that a given brightness distribution of the light on the light emission surface (4) is achieved.

12 Claims, 1 Drawing Sheet

LUMINOUS BODY

The invention relates to a luminous body, in particular in the shape of a planar lighting device for general lighting or for backlighting of displays, which luminous body comprises a plurality of light sources, for example LED elements, arranged in a housing, in particular an optical waveguide plate.

Luminous bodies are preferentially used with a light emission surface (coupling-out layer) extending over at least one of their surfaces for realizing planar lighting devices that extend in a plane. The light may then be generated both by point-shaped and by linear light sources in the luminous body. In particular, LED elements and fluorescent lamps may be used.

The aim in dimensioning these luminous bodies is to achieve not only as high as possible an efficiency, i.e. the lowest possible reflection losses in the luminous body, but also as even as possible a distribution of the luminous intensity over the light emission surface.

Various embodiments of such luminous bodies, and in particular various arrangements of the light sources in or at a housing or optical waveguide plate are known for achieving these aims.

Thus it is known, for example, to arrange the light sources along side walls of the optical waveguide plate (side-lit arrangement), so that light is coupled into the plate and is propagated therein by total reflection against the main surfaces and the side faces perpendicular thereto of the optical waveguide plate. A coupling-out layer at one of the main surfaces causes the light to be radiated to the exterior.

It is furthermore known to provide a plurality of cavities, each containing a light source, in an optical waveguide plate. The cavities each have an upper side facing the light emission surface of the optical waveguide plate and side walls. The upper side of each cavity is covered with a reflecting layer, so that the coupling of the light generated by the light source present in the cavity into the optical waveguide plate takes place exclusively through the side walls of the cavity (cavity-lit arrangement). Alternatively, light sources may be used which radiate the light exclusively in a direction parallel to the light emission surface of the optical waveguide plate. A comparatively homogeneous mixing and distribution of the light of each individual light source over the light emission surface of the luminous body can be achieved with these arrangements, and an even illumination can accordingly be obtained.

Finally, so-called direct-lit arrangements are known, wherein the individual light sources are inserted into a common housing whose side walls are manufactured from a highly reflective material or are coated with such a material, while the upper side of the housing is coated with a diffuser layer, so that the light from the light sources leaves the diffuser layer (light emission surface) of the luminous body in a comparatively homogeneous manner.

These arrangements each have their various advantages and disadvantages.

Thus the light can be propagated evenly and without disturbance in the optical waveguide plate in the side-lit arrangement mentioned above, so that it also distributes itself comparatively homogeneously over the light emission surface, but the achievable brightness of the luminous body is limited because only a limited number of light sources can be accommodated along the edge of the optical waveguide plate. In the cavity-lit and direct-lit arrangements, by contrast, a substantially larger number of light sources can indeed be used in relation to the surface area of the luminous body, but here special measures are necessary for ensuring that the achieved luminous intensity is accompanied by a sufficiently high or desired homogeneity on the light emission surface.

It is accordingly an object of the invention to provide a luminous body of the kind mentioned in the opening paragraph with which a particularly homogeneous illumination of the light emission surface can be achieved in combination with a comparatively high luminous intensity.

Furthermore, a luminous body of the kind mentioned in the opening paragraph is to be provided with which a very homogeneous illumination of the light emission surface can be achieved also with only a small constructional depth.

Finally, a luminous body of the kind mentioned in the opening paragraph is to be provided wherein the individual light sources are not recognizable, or are so only to a very low degree, on the light emission surface of the luminous body, in particular in the case in which the luminous body has only a small constructional depth.

According to claim 1, the object is achieved by means of a luminous body comprising a housing with a light emission surface and a plurality of light sources arranged in the housing, wherein the housing comprises at least a first optical medium with a first optical scattering power, into which medium the light of the light sources is coupled, and at least a second optical medium with a second optical scattering power, wherein the light propagating in the second optical medium is at least substantially coupled thereinto from the first optical medium, and wherein the scattering power of at least one of the media is chosen with a view to influencing the flow of light in the housing such that a predefinable brightness distribution of the light over the light emission surface is achieved.

A particular advantage of this solution is that the light-scattering media are capable of substantially completely compensating for disturbances in the propagation of the light in the housing (which would lead to darker regions on the light emission surface above the usually shaded light sources) caused by the light sources (or by the cavities provided in the optical waveguide plate for accommodating the light sources), so that the light reaches the light emission surface with a substantially more homogeneous intensity distribution.

The principle of this solution accordingly is not that the light directly originating from the light sources is homogenized, as in the prior art, but that the disturbed or reduced flow of light in the optical waveguide plate in the regions of the light sources (or cavities) can be compensated by an enhanced coupling-out of light from the relevant regions.

This is of advantage in particular with luminous bodies of small constructional depth, because here it is particularly difficult to homogenize the light that directly issues from the light sources.

Furthermore, the requirements imposed on the light emission surface or the coupling-out layer as regards their light-scattering properties can also be substantially reduced thereby.

The light emission surface or the coupling-out layer can accordingly serve substantially exclusively for generating a desired distribution or modulation of the luminous intensity (for example with brighter and darker regions).

Overall, therefore, the solution according to the invention combines the advantages of the side-lit arrangement mentioned above as regards the homogeneity of the light distribution on the light emission surface with the advantages of the cavity-lit and the direct-lit arrangements as regards the achievable high luminous intensity, without having to accept their respective substantial disadvantages.

The light sources used may be both substantially point-shaped and linear light sources, or a mixture of both kinds of light sources such as, in particular, LEDs and/or fluorescent lamps.

The advantages mentioned above come into their own in particular when colored light sources (for example colored LEDs) are used, because a desired color or mixed color can be generated with a high degree of homogeneity and evenness.

The dependent claims relate to advantageous further embodiments of the invention.

The embodiment of claim 2 gives a particularly high degree of certainty that the light will be coupled into the second optical medium exclusively from the first optical medium and not from one of the light sources. It is achieved thereby in particular that the light sources do not become recognizable even in the form of only slightly brighter regions on the light emission surface.

It is possible with the embodiments of claims 3, 5, and 7 to increase also the efficiency of the luminous body.

The embodiments of claims 4, 6, and 7 also provide a further improvement of the light distribution over the light emission surface.

The embodiments of the second optical medium of claims 8 to 10 render possible a very exact optimization of the scattering power as regards a homogeneous, or alternatively a desired, possibly non-homogeneous light distribution over the light emission surface.

Further details, features, and advantages of the invention will become apparent from the ensuing description of preferred embodiments which is given with reference to the drawing, in which:

FIG. 1 is a diagrammatic cross-sectional view of a luminous body according to the invention in the form of a substantially flat or planar light source.

Figure 1:
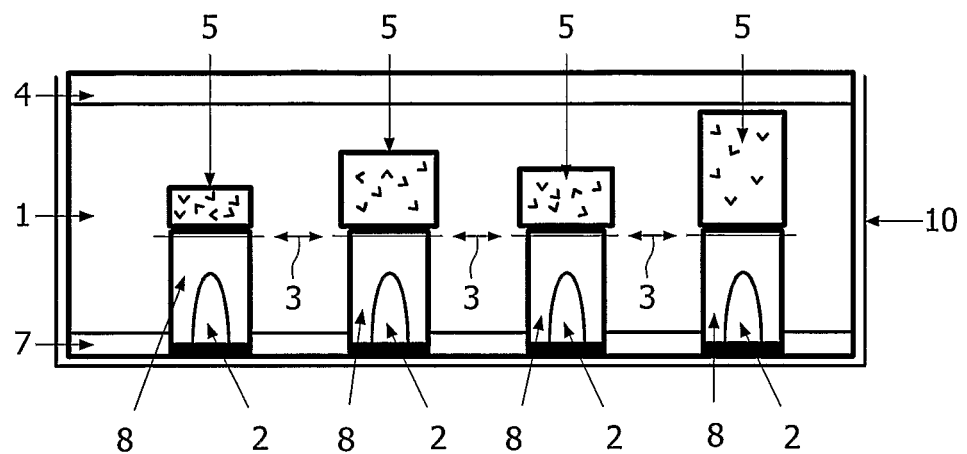
FIG. 1 is a diagrammatic cross-sectional view of a luminous body according to the invention.

The luminous body comprises a housing 10 whose walls are preferably coated with a diffusely highly reflective material.

Inside the housing 10 there is an optical waveguide plate 1 which forms a first optical medium with a first optical scattering power. The optical waveguide plate 1 is made, for example, from plexiglas and has a depth (thickness), for example, of approximately 10 to 15 mm and a length and width corresponding to the desired dimensions of the luminous body. Instead of the optical waveguide plate 1, the first optical medium may alternatively be air or some other gas.

The light is issued at a light emission surface 4, which has a scattering coupling-out layer and closes off the housing 10 at its upper side.

An air gap is preferably present between the lower side (rear wall 7) of the optical waveguide plate 1 opposed to the upper side and the bottom of the housing 10, so that the light is totally reflected there.

A plurality of light sources 2 is recessed into the rear wall 7. The light sources 2 are fastened to the rear wall 7 and are contacted in a usual manner. The light sources 2 radiate light either in all directions, or they are constructed such that they radiate the light substantially in lateral directions only, i.e. parallel to the light emission surface 4 or the optical waveguide plate 1.

The light sources 2 are either substantially point-shaped, preferably forming light-emitting diodes (LEDs), which are known and can be used, for example, with an electrical power rating of 1 and 5 W and in the colors blue, green, red, and white. Linear light sources may also be used, alternatively or in addition thereto.

A plurality of cavities 8 is provided in the optical waveguide plate 1 for accommodating the light sources 2.

As is further apparent from FIG. 1, a second optical medium 5 having a second optical scattering power, which is preferably higher than the first scattering power of the first optical medium 1, is present in the space between the respective cavities 8 and the light emission surface 4.

The second optical media 5 are made from a material such that they diffusely reflect the light incident thereon. The material and the dimensions of the second optical media are arranged and chosen such that they, on account of their scattering power, provide a compensation for the reduction in the flow of light in the optical waveguide plate 1 caused by the respective cavities 8 against which they are arranged, i.e. they increase the incidence of light on the light emission surface 4 in the regions above the respective cavities 8 such that this incidence of light corresponds to the incidence of light in the other regions, whereby a homogeneous or even brightness distribution on the light emission surface 4 is achieved.

As FIG. 1 shows, therefore, either a comparatively strongly scattering second optical medium 5 of comparatively small size or a comparatively weakly scattering second optical medium 5 (but still more strongly scattering than the first optical medium 1) of correspondingly larger dimensions may be used.

The second optical media 5 preferably extend over the entire surface of each cavity 8 facing the light emission surface 4, as is shown in FIG. 1.

The light-scattering properties of the second optical media 5 may be achieved, for example, in that they comprise a dispersion of scattering particles such as, for example, hollow globules with a refractive index different from that of the remaining material of the medium 5.

The scattering properties of the second optical media 5 can be optimized to the given dimensioning of the optical waveguide plate and its cavities in a comparatively simple manner through a suitable choice of the size of the particles and of the material from which they are manufactured, i.e. the refractive index thereof, and their number or density in the second optical media 5, so that a desired distribution (homogeneous or otherwise) of the luminous intensity on the light emission surface 4 is achieved.

Furthermore, the light-scattering second optical media 5 may also be created through laser engraving, wherein the focus of at least one laser beam changes the material of the second medium 5 in certain locations in a given manner, such that its scattering property is generated in a desired manner.

The coupling-out of light from the cavities 8 accommodating the light sources 2 can be substantially increased by means of these second optical media 5, as was noted above, so that the reduction in the flow of light through the cavities 8 can be compensated for.

Given a suitable choice of the second optical media 5 in accordance with the above discussion, the modulation of the light emission surface 4 or the coupling-out layer, which usually serves for homogenizing the light distribution, can be considerably reduced or even omitted, which also renders it possible to reduce the manufacturing cost of the luminous body.

On the other hand, a given (non-homogeneous) light distribution can now be generated in a substantially simpler manner through modulation of the light emission surface 4 or the coupling-out layer.

It may similarly be achieved through a suitable choice of the light-scattering properties of the second optical media 5 that the regions of the cavities 8 (i.e. of the light sources 2) appear more brightly on the light emission surface 4 in comparison with their surroundings. Alternatively, these regions may also be made to appear darker, for example if the scattering power of the second optical medium 5 is lower than the scattering power of the first optical medium 1.

A further alternative is that the light-scattering properties of individual or all second optical media 5 are electrically controlled, so that certain lighting effects can be achieved in this manner. For example, a user may switch over in this manner between a homogeneous luminous surface and a weakly luminous surface with bright dotted lines or circles integrated therein.

The surfaces of the cavities 8 facing (opposite) the light emission surface 4 each have a reflecting layer 3 which is dimensioned such that the light originating from the light sources 2 cannot directly hit the second optical media 5, but is reflected back from the layer 3 into the cavities 8 and into the first optical medium 1 (optical waveguide plate), from where it enters in part into the second optical media 5.

The layer 3 is preferably reflecting not only at the side facing the light source 2, but also on the other side, so as to improve the flow of light further. The layer 3 may also be provided directly on the second optical media 5.

The light emission surface 4 of the luminous body is formed by a diffusely scattering plate (diffuser plate), for example semi-transparent, whose degree of transmission preferably lies below 50% but may also be locally variable so as to achieve a given brightness distribution of the generated light.

Figure 2:
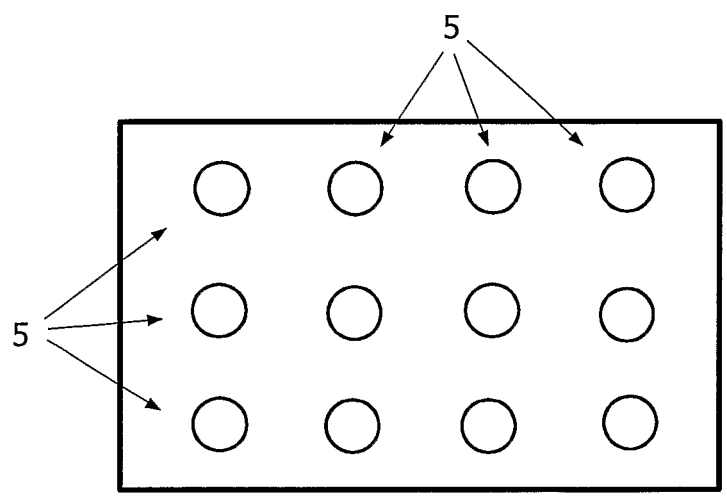
FIG. 2 is a diagrammatic plan view of the luminous body shown in FIG. 1.

FIG. 2 is a plan view of such a luminous body, wherein the light emission surface 4 or coupling-out layer has been removed for making the arrangement of the light sources (in this case of the second optical media 5) visible.

As is apparent from this Figure, the light sources are provided on the rear wall 7 in a regular arrangement, with spacings between them of preferably between approximately 1 and 5 cm if the LEDs mentioned above are used.

It is possible with this arrangement to realize a planar radiator with a very high homogeneity of the light distribution over the light emission surface 4 also in the case of a small constructional depth (i.e. the distance between the rear wall 7 and the light emission surface 4) of, for example, 10 to 15 mm and a comparatively large interspacing of the individual light sources 2 of, for example, 1 to 5 cm. Experiments have shown that an average intensity deviation of the light on the light emission surface 4 of well below 10% can be achieved without problems. In particular, the distance between the individual LEDs may then be approximately 2.5 to 5 times the constructional depth of the luminous body.

The lateral emission of the light from the cavities 8 causes the emitted light to be reflected mainly at the upper side of the rear wall 7 and the lower side of the light emission surface 4 in the case in which a gas is used as the first optical medium, i.e. with a wide angle of incidence each time, so that particularly low reflection losses occur and a high homogeneity on the light emission surface 4 and a high efficiency of the luminous body are achieved by the second optical media 5 also in this case.

Experiments have shown that luminance values of the luminous body of up to 20,000 cd/m$^2$ can be achieved with commercially available LEDs. When known white LEDs with an electrical power rating of 1 W are used, these luminance values lie at approximately 4000 cd/m$^2$.

This renders it possible to fulfill the usual requirements for light tiles for interior lighting, which lie between approximately 800 and 3,000 cd/m$^2$, without problems. This is true even for an application in backlighting of LCD picture screens, where 5,000 to 15,000 cd/m$^2$ are usually required, or for phototherapy applications.

The luminous body according to the invention can be dimensioned substantially as desired, i.e. luminous surfaces of substantially any size whatsoever can be realized. The intensity differences among the individual light sources are averaged out by the good lateral light distribution. Given a regular arrangement of light sources of different colors, for example with red, green, blue, or white light, a very well controllable color mixing can also be achieved.

If light sources with blue light are used, the light emission surface 4 may be provided with a color conversion phosphor which partly converts the blue light into light of longer wavelengths.

Light sources of substantially any color can be realized in this manner without the phosphor used for color conversion having to be introduced into the light sources, in particular into the LEDs. Life and efficacy problems can thus be avoided, in particular in highly loaded LEDs.

In addition, the color of the light can be changed through a simple exchange of the light emission surface 4.

The spatial radiation characteristic of the luminous body is substantially defined by the shape and gradient of the light emission surface 4 and usually have a Lambert-type character.

The light emission surface 4 may also be coated with optical foils which transmit light only within given angular regions and reflect it in other angular regions, so that a planar light source with a different radiation characteristic can be realized such as, for example, for certain applications (desk lighting). The light not transmitted is not lost but is reflected back into the luminous body.

Finally, moving background lighting effects can be realized through a (sequential) switching on and off of individual groups or strips of LEDs, for example for use in LCD-TV displays.

The invention claimed is:

1. A luminous body comprising:
   a housing with a light emission surface and a plurality of light sources arranged in the housing, wherein the housing comprises: at least a first optical medium with a first optical scattering power, into which medium the light of the light sources is coupled; and
   a plurality of second optical medium elements with a second optical scattering power disposed in the housing, wherein each of the second optical medium elements comprises a plurality of particles, and each of the second medium elements is disposed over a respective one of the light sources.

2. A luminous body as claimed in claim 1, with at least one layer by means of which the second optical medium is screened off at least substantially against a direct incidence of the light originating from a light source.

3. A luminous body as claimed in claim 2, wherein the layer is a layer that reflects on both sides.

4. A luminous body as claimed in claim 1, wherein the second optical medium is introduced into a region between at least one light source and the light emission surface.

5. A luminous body as claimed in claim 1, wherein the first optical medium is an optical waveguide plate, and the light sources are arranged in at least one cavity of said optical waveguide plate.

6. A luminous body as claimed in claim 5, wherein the scattering power of the second optical medium is chosen such that it compensates at least substantially for the reduction in the flow of light in the first optical medium caused by at least one of the cavities provided in the first optical medium.

7. A luminous body as claimed in claim 5, wherein the second optical medium is introduced into at least one region between at least one cavity and the light emission surface.

8. A luminous body as claimed in claim 1, wherein the second optical medium comprises light-scattering particles.

9. A luminous body as claimed in claim 8, wherein the light-scattering particles are globules with an optical refractive index different from that of the surrounding material.

10. A luminous body as claimed in claim 8, wherein the light-scattering particles are regions created by a material change caused by the action of at least one laser beam.

11. A luminous body as claimed in claim 1, wherein the light propagating in each of the second optical medium elements is at least substantially coupled thereinto from the first optical medium.

12. A luminous body as claimed in claim 1, wherein the scattering power of at least one of the media is selected to influence the flow of light in the housing such that a predefinable brightness distribution of the light over the light emission surface is achieved.

* * * * *